Sept. 13, 1960  A. DAVIS  2,952,075
TARGET DETECTION SYSTEM
Filed Dec. 3, 1958  5 Sheets-Sheet 1

INVENTOR.
ARTHUR DAVIS
BY
ATTORNEY

Sept. 13, 1960          A. DAVIS          2,952,075

TARGET DETECTION SYSTEM

Filed Dec. 3, 1958          5 Sheets-Sheet 2

INVENTOR.
ARTHUR DAVIS

BY *William V. Pesce*

ATTORNEY

INVENTOR.
ARTHUR DAVIS

INVENTOR.
ARTHUR DAVIS

United States Patent Office 2,952,075
Patented Sept. 13, 1960

2,952,075

TARGET DETECTION SYSTEM

Arthur Davis, Forest Hills, N.Y., assignor to Autometric Corporation, New York, N.Y., a corporation of Delaware Filed Dec. 3, 1958, Ser. No. 777,944

11 Claims. (Cl. 33—1)

This invention relates to a system for target detection by aerial means, and is particularly directed to a system for data reduction of aerial photographs including those taken by radar and infra-red means. In general it is the purpose to extract from aerial photographs, taken by optical, radar and other means, information concerning structural objects indicative of significant target information and the like, and also to correlate this information with similar information taken at different times to obtain pertinent information of significant changes, if any, of the land under aerial surveillance.

The detection system as contemplated by the instant invention takes cognizance of the fact that structural objects such as air-fields, buildings, depots and the like, have regular shapes and configurations, their borders in general having straight lines or regular curvature. However, those objects and features, not man made, have in general irregular features, their borders being erratic and non-regular in shape. These differences in border configurations are made use of in detecting targets, and are especially useful for photo-interpreters in the location of military establishments and other objects of military significance.

In general, those borders regular in shape have point symmetry, that is, symmetry about a point, such as a line having symmetry about its center-point or partial symmetry about other points, a circle about its center, and so on. However, borders irregular in shape have no point symmetry, and, therefore, no symmetry about any point may exist. Knowing that man-made structural objects have regular shaped borders, and have symmetry about a fixed point, it becomes necessary to extract only borders which have point symmetry. Once this information is acquired and recorded, pertinent data as to target existence, location and identification is established.

Basically, the concept of determining borders of point symmetry can be demonstrated in the following manner. Consider a photograph of the type under consideration having two continuous borders, one border of point symmetry and the other having no point symmetry. An exact tracing is then made of the original picture, and the tracing completely turned around 180 degrees, and then laid on the original picture. The tracing is then moved or projected to all possible overlay positions of the original picture, while still maintaining the 180 degree rotation. The positioning of the reversed picture tracing in overlaying the original or unrotated picture is done in a systematic manner to determine all possible intersection of the borders of the target areas. As the overlay motion proceeds it will be noticed that the target borders of the original picture and the inverted overlay picture are occasionally coincident at several points, coincidence being defined as the crossing of the lines of the overlay picture with those of the underlay picture. Where the target borders having no symmetry are in the vicinity of borders with symmetry then random coincidences occur, random coincidence meaning non-contiguous coincidences. When the overlay non-symmetrical border is in the vicinity of the original non-symmetrical border again, only random coincidences occur. However, the symmetrical border for one position of the overlay (except for a straight line) exactly matches the underlay, that is, a multiple contiguous coincidence exists. If the overlay is shifted even slightly from this multiple coincidence position then only random coincidence exists again. It sould be appreciated that for straight lines, multiple coincidences occur a great number of times for the various segments of the lines. Therefore, for straight lines only, there will occur generally a large plurality of multiple coincidences. Hence, by arranging means for detecting multiple coincidences indicative of straight line borders a system for detecting target structures will have been formed.

An electronic system to demonstrate and produce the equivalent of the system above described is contemplated by the invention embodied in the instant application, and in general involves the use of TV-type scan light source from a cathode-ray tube. The light from the scanning beam is first transmitted through the film, the output thereof being intensity modulated by the film. Each time a border is intercepted or crossed by the beam, the light intensity thereof will be altered acordingly, so that the modulated light beam, when focused upon a photo-electric cell, will be transformed into an output electrical signal indicative of the density variations of the film along a particular scan line. The electrical signals in particular will be essentially in the form of a stepped wave occuring at target borders with other minor variations thereof appearing whenever there appears a definite change in film density, e.g. going from one gray area to another gray area of different intensity. In order to give a 180 degree reversal effect to the film, a reversed scanning of the film by the original light beam is used. Hence, by reversing the scan so that it starts at the lower right hand corner of the picture and proceeds to the upper left hand corner thereof, the output light modulated signal will be the reverse of the original output signal. The output electrical signals produced in the area of the straight line target borders are generally stepped waves equally spaced in time for the particular border in question. If the stepped signals are differentiated the pulses resulting therefrom will be representative of the target borders. The expression for the time or period between pulses may be expressed as follows:

$$t = \left(1 - \frac{d}{ML}\right)T$$

where $t$=time between pulses for a particular target border,
$T$=scan line period,
$d$=distance between scan lines,
$L$=length of line,
$M$=slope of target border.

For the reverse scan the expression for the time between pulses is, $$t_1 = \left(1 - \frac{d_1}{M_1 L_1}\right)T_1$$

but since the same scan is used as will be later described, then, $T=T_1$, $d=d_1$ and $L=L_1$.

Since the scanning line has been effectively turned around by 180 degrees, $M=M_1$.

The two scans will produce outputs having the same period except that the respective outputs will be displaced in time. Therefore, by the simple expedient of moving one scan relative to the other essentially displacing the scan relatively, pulse coincidence may be obtained. These coincidences will be multiple coincidences, for they occur on successive lines and will also be multiple-multiple coincidences in that portions of each train of pulses may be matched producing sets of multiple coincidences as above. In similar situations the process would be the same for other borders of point symmetry producing sets of multiple coincidence pulses as above. Finally non-point symmetrical borders will fail to correlate on successive lines and, therefore, only random coincidences will occur.

It is, therefore, a primary object of the present invention to provide an improved system for data reduction and photo-interpretation of aerial photographs taken by optical, infra-red, radar and similar means for the detection of significant targets.

Another object of the invention is the detection of target borders having regular shapes or configurations, and having symmetry about a fixed or central point, such regular border configurations being indicative of man made objects.

Another object of the invention is the ability to process large quantities of film in a relatively short period of time for the purpose of showing where man made objects are located and the storage of such information for speedy access thereto at future times.

A still further object of the invention is to provide an electrical detection system for the detection of target structures which is precise, accurate, rapid, economical and automatic.

Further objects, aspects, and advantages of the invention will become apparent from a study of the specifications and the accompanying drawings wherein.

Figure 1:
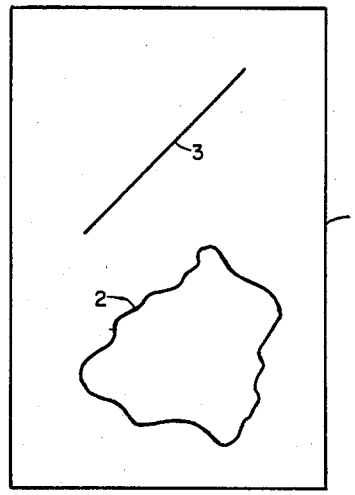
Fig. 1 shows a photograph taken by any of the available means using optical, radar and infra-red techniques and the borders of areas having definite demarcations in terrain evidenced by the variations in film density at the point of demarcation.

Now referring to the drawings and particularly to Fig. 1 there is shown an aerial photograph 1 taken by any of the conventional methods such as by optical, radar and infra-red means. The area photographed in particular shows definite contours or borders indicative of demarcations in the terrain from one border area to another. In general those contours or borders 2 irregular in shape are indicative of the natural shape of the land whereas those borders 3 having regular or straight line configuration are indicative of structural or man made objects. These definite changes in the land areas show up on a picture as demarcations or changes in film density.

Figure 2:
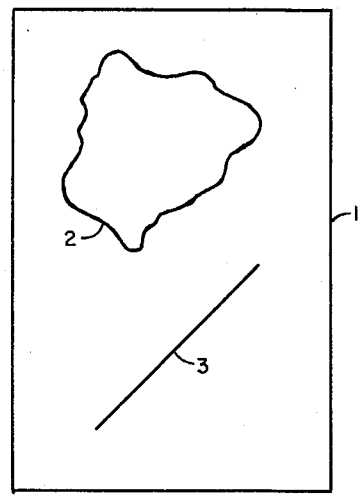
Fig. 2 shows the same photograph of Fig. 1 turned around by 180 degrees.
Figure 3:
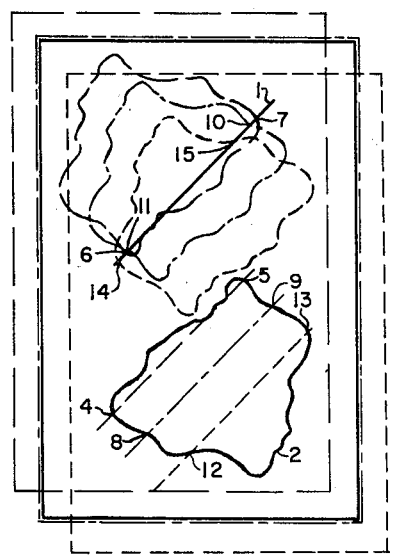
Fig. 3 shows Figs. 1 and 2 superposed on one another with Fig. 2 positioned at different points with respect to Fig. 1 while still retaining its 180 degree reversed position to give points of coincidence wherever the borders intersect.
Figure 4:
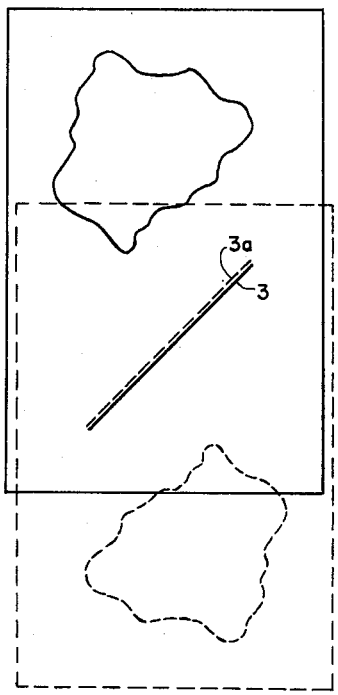
Figs. 4 and 4a show Figs. 1 and 2 superposed as in Fig. 3 but where the straight line borders coincide and merge to produce multiple-multiple coincidences for partial and full length of the target border.
Figure 4A:
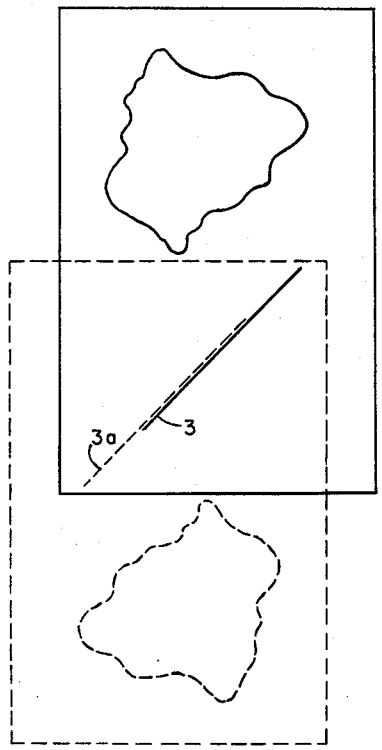

Fig. 2 is identical to Fig. 1 but turned around completely by a full 180 degrees. The reversal can be accomplished mechanically or, as will be described later, electrically by a novel system embodied in the present invention. Fig. 3 further shows and illustrates how Fig. 2 may be superimposed upon Fig. 1 while still maintaining the 180 degree reversal therewith. However, it can be appreciated that Fig. 2 can be so disposed with respect to Fig. 1 that many other relative placement positions may be utilized, such other positions being indicated by the broken line variations of the borders. For instance, in Fig. 3, one overlay position produces an intersection or coincidences of the border at points 4, 5, 6 and 7. Another overlay position produces coincidences at points 8, 9, 10 and 11. Still another overlay position produces coincidences at points 12, 13, 14 and 15. The overlay positioning of Fig. 2 with respect to Fig. 1, while still always maintaining the 180° phase reversal, continues until all possible relative positions of Fig. 1 and Fig. 2 are had in which some degree of overlay exists. Fig. 4 shows the straight line border 3 and 3a where in effect the border line 3a is line 3 but disposed directly thereover. However, to facilitate showing coincidence of the border lines, they are displaced a distance apart merely to give a 3-dimensional effect. In Fig. 3, although coincidence occurs between the straight line borders and irregular borders, the intersections are relatively few and non-contiguous in nature. However, in Figs. 4 and 4a where the straight line borders are in complete or partial alignment for a particular overlay position, multiple coincidence will occur, such multiple coincidence being indicative of target borders which are regular and very likely man made. The coincidences for a straight line border intersection are regular and continuous so that when scanning the particular border each scan line will produce a signal, the period thereof being regular and continuous.

Figure 5:
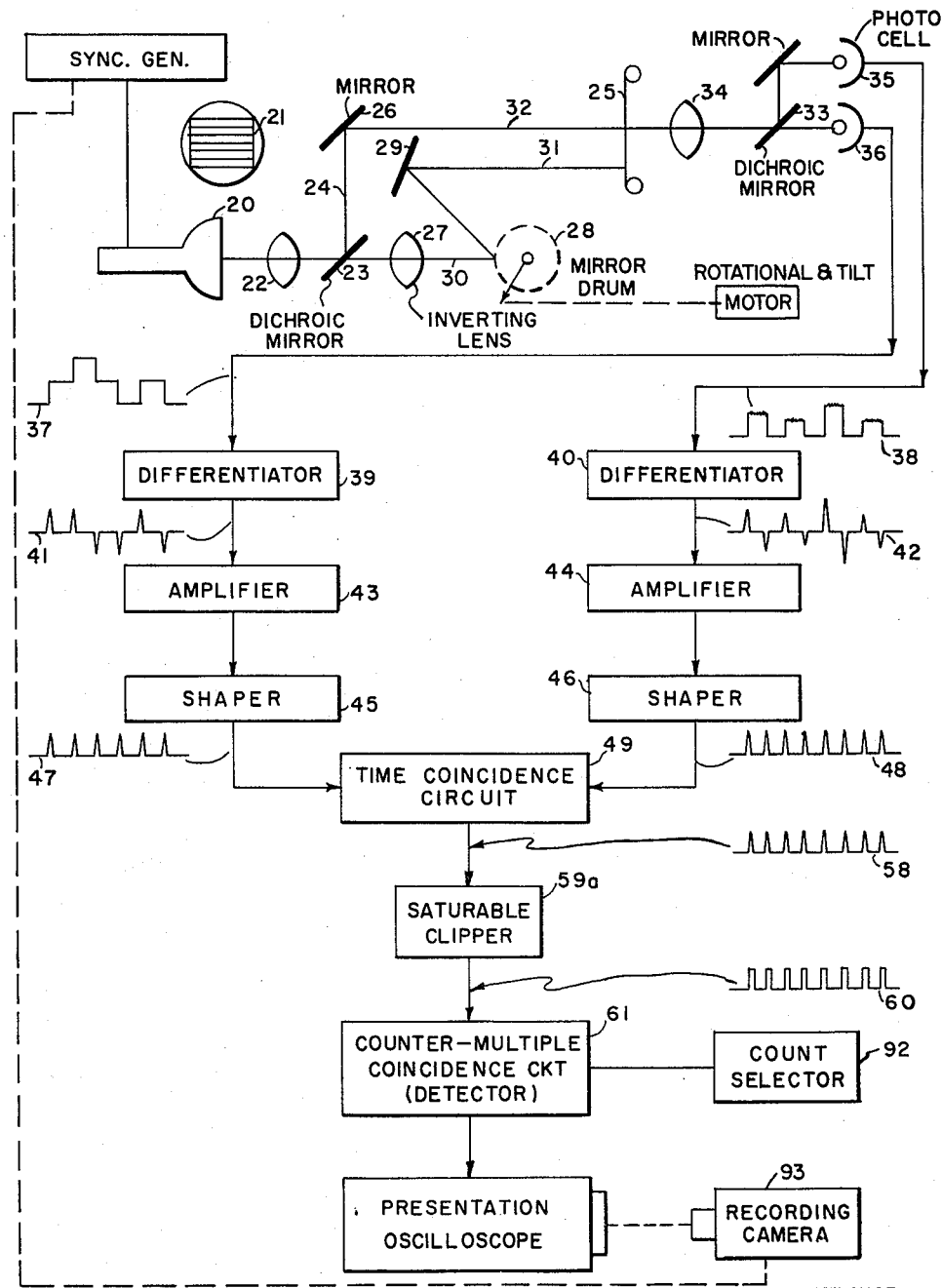
Fig. 5 shows a block diagram of an all electrical system, according to the invention, for the detection of borders indicative of demarcations in land areas which are regular in shape and representative of targets and man made objects.

In order to produce the signals indicative of regular border information an electronic system illustrated in box form in Fig. 5 is used. The system in general comprises a flying spot scanner 20 operating in the normal manner to produce a line raster 21 of say 400 lines at a 60 cycles per second frame rate although other scanning rates and number of lines may be used. The resulting scan is focused, by lens 22, on a dichroic type of mirror 23 so that the light therefrom splits into two colored light paths, say a green colored light path 30 and a blue colored light path 24. The film frame 25 is held in position in the normal manner by any suitable type of film holder. The blue light path is made to scan the film directly via reflecting mirror 26, so that the complete film frame is scanned or intercepted by this light beam. The green light path 30 is inverted by an inverting lens 27, and imaged upon a rotating mirrored drum 28. The drum has a plurality of elongated mirror strips, each spaced from the other, so disposed about the outer periphery of the drum as to give the effect of vertical displacement of the scan when the drum is rotated about its longitudinal axis. The mirror drum has not only motion in a rotatable manner, but also has tilting or rocking motion, that is the drum has a tilting motion along its longitudinal axis. The drum can be pivotally fixed at one end and made to undergo this rocking or tilting motion relative to the pivot point. It is also possible to pivotally fix the drum along a point intermediate the end and so rock the drum with respect to the pivot point to achieve the same scan movement. The rotary motion of the drum produces motion along the scan line, e.g. causes the complete raster to shift from left to right, whereas the tilt motion causes displacement of the raster in a vertical direction, e.g. from top to bottom. In particular, the rotional speed of the drum is such that the complete raster is shifted across the whole frame of the film and as the next mirror or segment of the drum rotates in place, the action is started over again, that is to say, the complete raster is shifted from one extremity of the film frame to the other for each segmented portion of the drum. At the same time, the mirror is tilted in a direction to produce a shift in the raster in the vertical direction. The rotation of the drum and also the tilting thereof is produced by the electrical motor not shown, driven by an ordinary A.C. power source. Since the raster produced by the flying spot scanner is synchronized to the power lines, as is usually the case, both the electrical motor driving the mirror drum and the line scanning will have a definite synchronous relationship. It is now seen that two line beams are produced by a single line spot scanner source, beam 31 and beam 32. However, beam 31 is a scan which is completely reversed to beam 32 and its effect is to produce an output having the reverse image of beam 32. Both line beams effectively are being modulated by the variations in density of the film frame 25 so that the respective images thereof are reversed to each other and displaced in accordance with the displacements of the respective scans. Hence, in this manner all possible positions of the inverted scan, relative to the direct scan, are produced on the film. The drum mirror scanning type systems are well known and their operations can be found in the literature such as in the book entitled "Television" by Zworykin and Morton, 2nd edition, chapter 8. A reflecting mirror 29 provides the means of causing the green light scan to intercept the film frame 25. Although, the above shows one method of causing direct and reverse scanning by two light beams upon the film frame under observation, it may be appreciated that other methods may be used for the generation of the said light beams, the end effect being the same, namely to give the impression of reversing the film frame, and causing the same to be impressed upon and moved in all possible overlay positions relative to the original film frame.

The dual light paths 31 and 32 scanning the film 25 in opposite directions are each modulated in accordance with the density of the film, and the outputs thereof imaged on dichroic mirror 33 by lens 34. The dichroic mirror 33 separates the two light beams, causing the blue light beam to impinge upon photo-electric cell 35, and the green light beam to impinge upon the photo-electric cell 36. The green and blue modulated light beams are transformed into a group of electrical signals representative of the changes in film density during the scanning process. The density changes are erratic and relatively slight in those areas confined within the target borders, but at the borders the demarcations and change in density become more pronounced, giving rise to relatively greater signal changes at the borders. The output signals 37 and 38 from the photo-electric cells 35 and 36 each have a somewhat stepped wave characteristic, a steep side generally showing the sharp transition at the borders of the film, whereas the other portions of the wave have smaller transitions indicative of small changes in film density. These particular wave forms are merely illustrative, and other wave forms may be the result of scanning a particular area, that is a stepped type of wave may result in going along a particular scan line from area to area. It may be appreciated that the signal variation is greatest at the target borders as compared to the signal variations confined to areas within the borders. To produce signals corresponding to the target borders, the output signals 37 and 38 are each differentiated by differentiating circuits 39 and 40. Pulse type electrical signals 41 and 42, which are both positive and negative in polarity, represent the borders of the area being scanned. The differentiating circuits 39 and 40 can be any of the types of RC networks normally used whose time constant is small relative to the transition time to cross a border.

Figure 6:
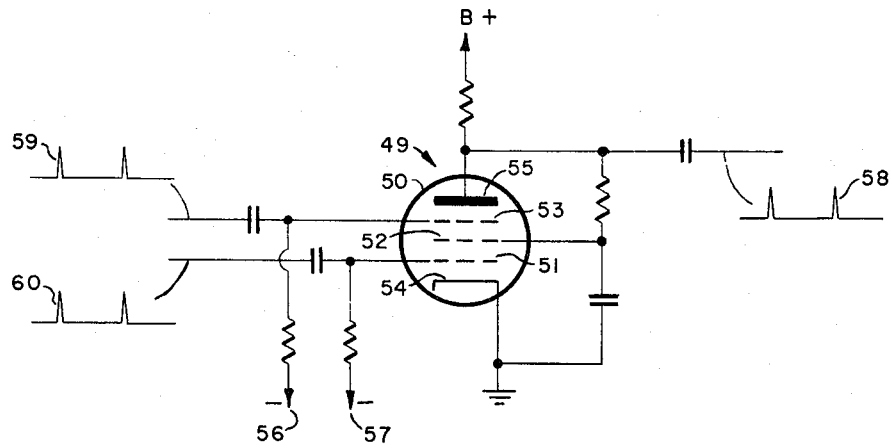
Fig. 6 shows a circuit diagram of a typical type of coincidence detector circuit used in the instant invention.

The pulsed electrical signals 41 and 42, representative of target border information, are each amplified by suitable amplifiers 43 and 44 so that only the pulsed portion of the signal stands out, this portion being used for triggering one-shot multivibrators 45 and 46, which shapes the signals. The portions of the electrical signals falling between the pulses are lost in the triggering process because they fall below the level at which the multivibrators are set to trigger. Multivibrators or shapers 45 and 46 are of the conventional one-shot type, and the circuitry and operation pertaining thereto are of the standard conventional type common to the art. The quantized or limited signal outputs 47 and 48 from the multivibrators are pulsed type waves, each pulse having the same polarity, amplitude and width. The signal outputs 47 and 48 are then compared in a time coincidence detector circuit 49, whose function it is to generate an output signal only, and only when there appear pulsed signals at both inputs at the same time. Fig. 6 shows a typical coincidence detector circuit utilizing a pentode-type of electron discharge device. The detector 49 comprises a conventional pentode tube 50 having control grids 51, 52 and 53, a cathode 54 and anode 55. Control grids 51 and 53 have fixed negative bias developed from bias sources 56 and 57. The tube is so operated that an output anode signal 58 will appear only when positive signals 59 and 60 appear simultaneously on both grids 51 and 53. If only one grid has a signal, there will be no output signals, the tube continuing to remain cut off, and of course failure of any signal to appear on the said grids will result also in no output signal.

The output signal 58 is passed through a saturable clipper 59a for the purpose of producing a series of pulses all of equal amplitude and substantially noise free. The said clipper can be of any of the conventional circuits for clipping the pulsed signals at some particular amplitude setting or level. It can be said at this point that the pulsed signal 58 represents borders which the two scans have detected at the same moment of time.

Figure 7:
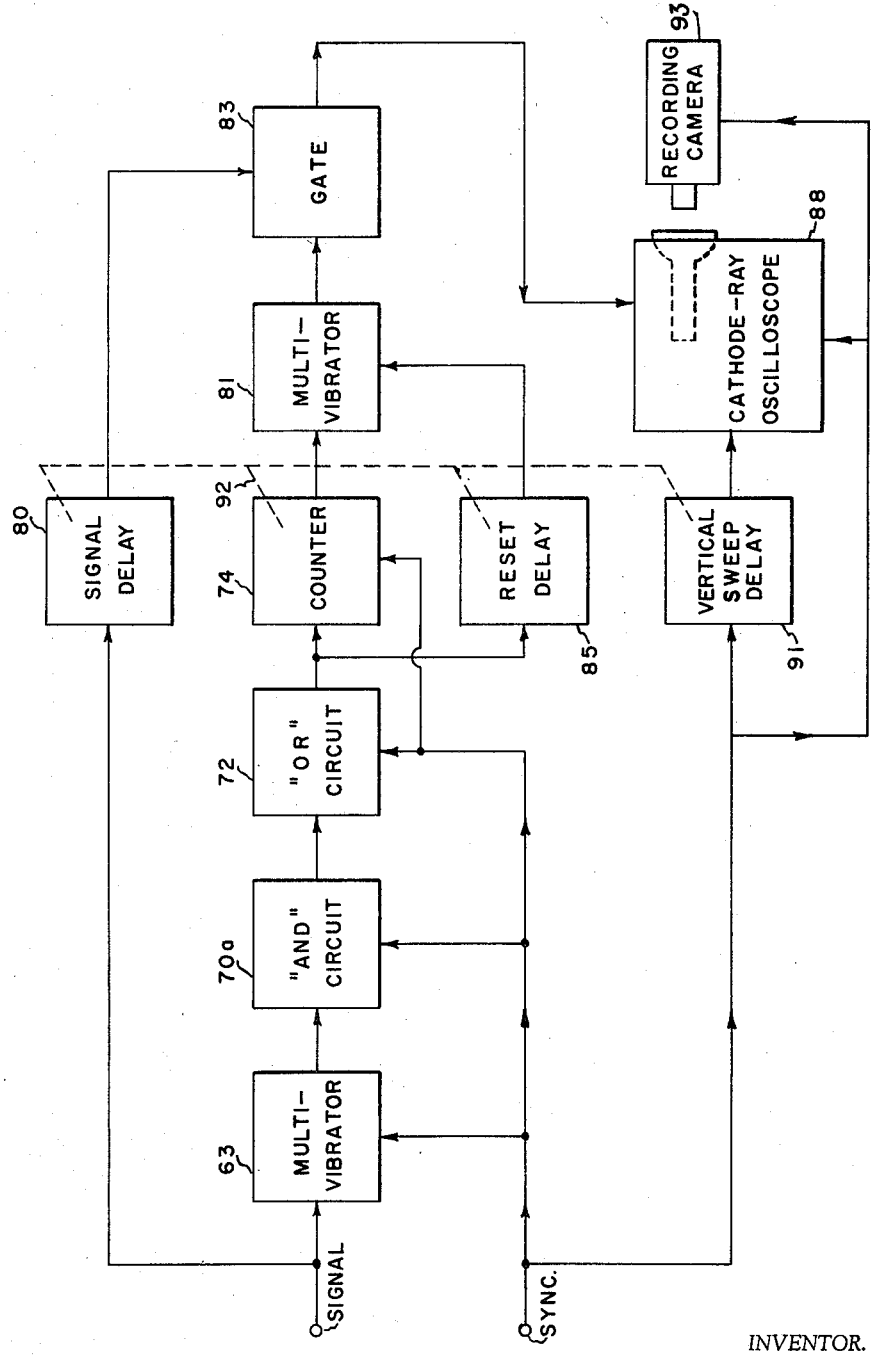
Fig. 7 shows a block diagram of the counter multiple-coincidence circuit according to the invention for demonstrating the past history of the target border information for a pre-determined period of time.

The output signal 60 from the saturable clipper 59 is next fed to a multiple coincidence detector 61. The object of the detector is to obtain an output signal when an input signal is present on a given number of successive scan lines. The number of successive lines can be set in the multiple coincidence detector. The multiple coincidence detector is essentially a counter which counts the successive scan lines on which coincidence pulses occur; however, in the absence of a pulse the counter resets and starts counting over again. An output signal appears from the detector apparatus when the required number of scan lines have gone by, the said signal output then being used to reset the counter again. Fig. 7 shows in more detail the multiple coincidence detector 61, and although the system as shown is one particular way of achieving the desired end result, it may be appreciated that other means and methods for doing the same thing may be utilized to produce the same result without detracting from the novelty or true purpose of the invention as embodied in the instant application.

Figure 8:
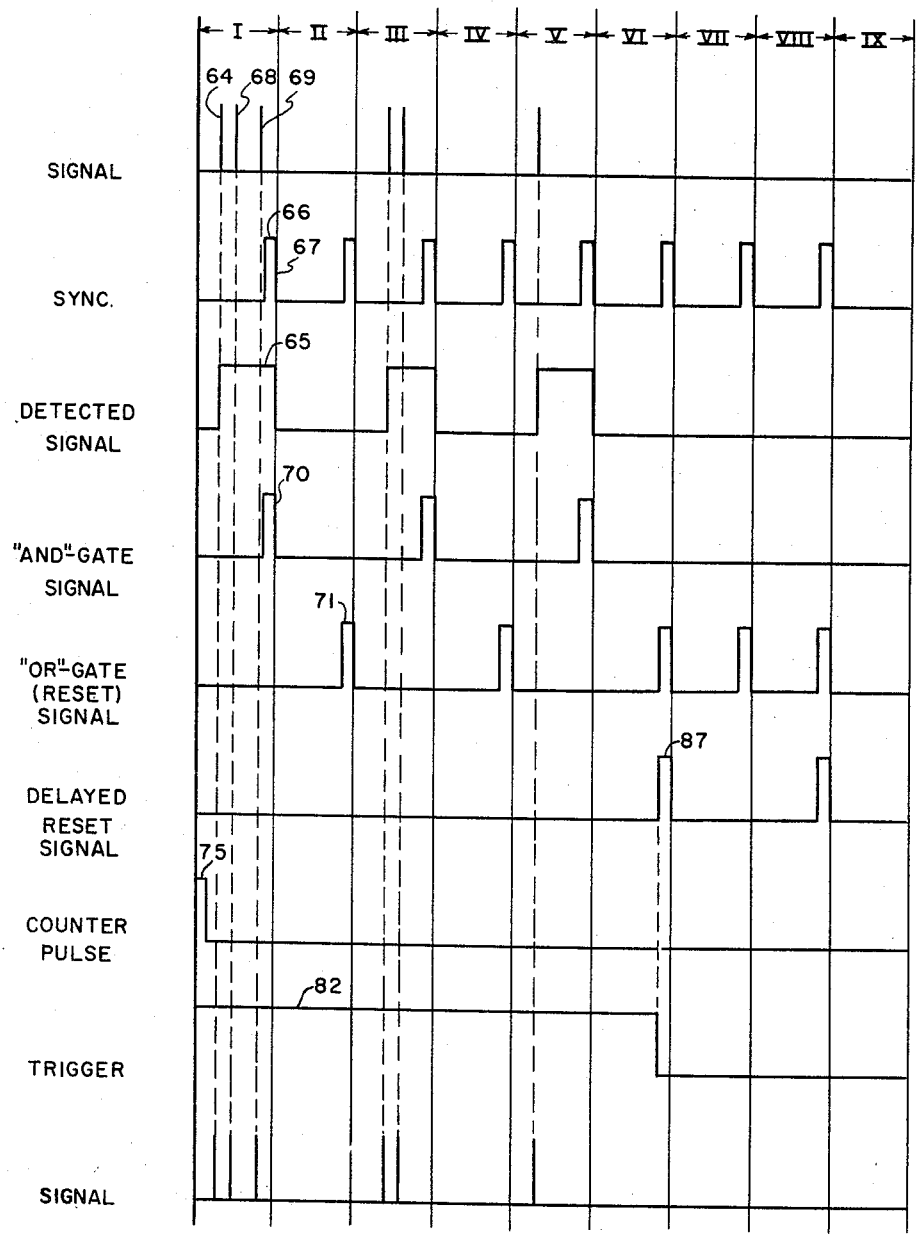
Fig. 8 shows a timing diagram of the target and sync pulses according to the inventions.

The detector comprises in general a counter for the purpose of receiving sync pulses generated from a fixed generating source, and counting the said pulses for a pre-determined number of scan lines. Simultaneously with the reception of the sync pulses, the counter also receives reset pulses for the purpose of resetting the counter in the absence of any target border signals during a particular scan line. Target border signals and their timing sequence with respect to the sync sequence are better illustrated in Fig. 8 which shows the various generated signals and their timing sequence, one relative to the other. For convenience, the scan periods or lines are denoted by the Roman numerals I–IX inclusive. For the purpose of determining and detecting the presence of any border signal during a scan line, a flip-flop circuit 63 of the common bi-stable variety is used. The first border signal 64 triggers the flip-flop circuit to produce a pulse 65. The duration is determined by the sync pulse 66 which shuts off the multivibrator 63. In this particular instant it is the trailing edge of the sync pulse which shuts off the multivibrator. It may be appreciated that the other border signals 68 and 69 occurring during the particular scan period, here scan period Roman numeral I, has no effect on the wave shape of the output of the multivibrator. Hence, if during any particular scan line there appears a plurality of border signals, the indication thereof will be represented by a single detected border pulse emanating from the multivibrator during the particular scan period. The detected border signal, which is the particular output from multivibrator 63, is next transmitted to an "and" circuit 70a which is a circuit having a pair of inputs and one output. The "and" circuit as utilized here is merely a circuit which produces an output signal whenever there are simultaneously present a pair of input signals. In the instant case detected signal 65 is combined with sync signal 66 at the inputs of the "and" circuit to produce an output signal 70. It may be observed that during the second scan line period II there appears no detected signal, therefore, there will be no resulting output from the "and" circuit. This is better illustrated in Fig. 8. The output from the "and" circuit 70a is transmitted to a type of circuit called an "or" circuit 72 which is similar but differs in that it fails to produce an output in the presence of two simultaneous input signals. It may be appreciated that both the "and" and the "or" circuits are rather common to the computer art and, therefore, not described any further here. It is a major function of the "or" circuit to generate an output signal only when there appears a signal on just one of the pair of input circuits. Referring to the timing diagram of Fig. 8 it can be seen that the presence of both detected and sync signals during the first scan period fails to produce an output from the "or" circuit; however, during the second scan period the absence of a detected signal 65 results in an output signal 71. The output of the "or" circuit 72 is subsequently fed to a counter 74 for reset purposes. The counter 74 is a decade type counter which utilizes a series of bi-stable multivibrators so connected as to produce a given output pulse for a given number of input pulses. In particular, the counter 74 receives sync pulses 66, each of the pulses so received representing a definite scan line. The counter 74 also receives pulses 71 from the "or" circuit 72 whenever there are no border signals present. It is a function of the signal 71 generated by the "or" circuit to stop the count of the counter 74, and reset same so that the counter can start to count over again. It can be appreciated that in the absence of any reset pulses, the counter will reach its full count to produce an output pulse to start a new sequence of counting.

In order to be able to observe the past history of the scanning process as it affects any particular target border, it becomes necessary to delay the signal information for the number of scan lines selected for observation. To be able to do this, the signal is first delayed by a variable delay line 80 for a time equal to the fixed number of scan lines. It may be appreciated that delay line 80 illustrated in box form in the particular drawing may be any of the common type delay lines peculiar to the art and adequate for the purpose. After the counter 74 has counted the desired number of sync pulses 66 representative of a predetermined number of scan lines as determined through experience to be sufficient to give the past history of a typical target border it produces an output pulse 75 which pulse in turn triggers a multivibrator 81. The output signal 82 from multivibrator 81 is then transmitted to a gate circuit 83 which permits the gate 83 to remain open for a given period of time until it is shut off. This shutting-off occurs in the following manner. The "or" circuit 72 output reset pulse which is used without delay to start the counter counting over again, is elsewhere used after being delayed for the desired delay period by variable delay line 85, the delay line being similar in construction and operation to delay line 80. The delayed reset pulse 87 is transmitted to bi-stable multivibrator 81 to turn it off so that the output thereof when fed to the gating circuit 83 renders the same non-conductive. Hence, the period in which gating circuit 83 is open is the period selected for the given number of scan lines, and any border signals occuring during this period are passed through the gate 83 and subsequently fed to a cathode-ray tube oscilloscope 88 where they are observed. In order to properly synchronize the cathode-ray oscilloscope with the delayed incoming signals, it becomes necessary to delay the vertical sweep of the said cathode-ray oscilloscope for the same time period by which the border signals were delayed. This can be done by delay line 91 which receives vertical sync pulses from the same sync source as the detector. Here again delay line 91 is used which is similar in construction and operation to the other delay lines previously described. The delay line circuits 80, 85 and 91 are all ganged together with the selector switch 92 of the counter which switch selects the given number of count lines. All of the delay lines and the selector switch in the counter circuit are ganged since all of these particular components are interrelated insofar as they affect the number of scan lines selected and delayed for purposes of observing the border signals developed during this particular interval of time.

The border signals thus occurring during the selected scan line period, and observed on a cathode-ray tube monitor, may be permanently recorded by a film recording camera 93 whose film pull-down mechanism may be synchronized with the sweep system of the said cathode-ray tube. The synchronization of the camera is shown by a dash line from the sync generator to the camera and is for illustrative purposes only.

Although for purposes of instruction and illustration, certain preferred embodiments have been shown, it may be appreciated that other forms and embodiments may be made and changes may be effected without detracting from the true purpose and intent of the applicant's invention herein.

Having described the invention, what is claimed is:

1. A target detection system for data reduction of aerial photographic film having imaged thereon straight line and symmetrical terrain borders indicative of man-made objects and comprising means for fixedly positioning the said film in a first position for observation purposes, a scanning light source for producing a pair of light paths for intercepting the said film, means in one of the light paths to cause the said light to undergo a reverse scanning movement and simultaneously therewith to undergo a vertical and horizontal displacement relative to the other path of light, the said scanning light paths maintaining a constant 180 degree phase relationship one with the other and intersecting at all possible area borders on the film, the said points of intersection forming coincidences of marked changes in film density representing a change in type of area from one location to another, means responsive to the scanning of the said concidence points representative of area borders to yield distinctive electrical signals, the said coincidence point signals being repetitive and displaced at discrete regular intervals of time for borders having symmetric and straight configurations, and erratic and random for borders non-symmetric and irregular in configuration, means disposed to extract those electrical signals which are repetitive and regular and indicative of symmetric and straight line borders from those signals which are erratic and random in nature for a predetermined interval of time and means for visually displaying the said repetitive and regular electrical signals for the given predetermined interval of time to indicate the presence of symmetric and straight line borders indicative of man-made objects and targets.

2. A target detection system for extracting symmetric and straight line data information indicative of man-made structures from aerial photographic film having imaged thereon terrain under surveillance, the said system comprising a flying spot scanner including a stabilized signal source, means to project images of the scan along two light paths and terminating in a single plane area, means disposed in one of the said light paths to cause the said light to undergo a reverse scanning movement and simultaneously therewith to undergo a vertical and horizontal displacement relative to the other path of light, means for fixedly positioning the film in said area to intercept the said light scans and modulate same in accordance with the film density, the said reverse light scan effecting a 180 degree phase relationship with the other light path and displaced both horizontally and vertically to accomplish all possible shifted overlapping positions while in the said 180 degree phase position with respect to the unreversed light scan and intersecting at all possible area borders, the points of intersection forming coincidences indicative of marked changes in film density representing a change in type of area from one location to another, means for converting the said points of intersection indicative of area borders into electrical signals, the said points of intersection being repetitive and displaced at discrete regular intervals of time for borders having symmetric and straight line configurations, and erratic and random for borders non-symmetric and irregular in configuration, means disposed to extract those electrical signals which are repetitive and regular and indicative of symmetric and straight line borders from those signals which are erratic and random in nature for a predetermined interval of time, and means for visually displaying and recording the said repetitive and regular electrical signals for the given predetermined interval of time to indicate the presence of symmetric and straight line borders indicative of man-made objects and targets.

3. A target detection system for extracting symmetric and straight line data information indicative of man-made structures from aerial photographic film having stored thereon information of terrain, the said system comprising a television type scanning system, means for imaging the said scan along a pair of light paths each terminating in a single plane area, optical means disposed in one of the said light paths to cause the said light to undergo a reverse scanning movement and simultaneously therewith to undergo a vertical and horizontal displacement relative to the other path of light, means for positioning the film in the said area to intercept the said light scans, the film modulating the said light in accordance with the stored information thereon, the said reverse light scan effecting a 180 degree phase relationship with the other light path and displaced both horizontally and vertically so as to accomplish all possible shifted overlapping positions while in the said 180 degree phase position with respect to the unreversed light scan and intersecting at all possible area borders, the said points of intersection forming coincidences, which are indicative of changes in the film density which represent changes in type of area from one location to another, means for converting the said coincidence points indicative of area borders into electrical signals, the said coincidence points derived from each of the light scans as they traverse the film area, one in a first direction and the other in the reverse direction, means for receiving and differentiating the said electrical signals to produce a series of pulses coinciding with the area border under consideration, means for receiving and shaping the said differentiated signals to form a series of pulses having equal amplitude and pulse width, a time coincidence circuit for receiving the shaped pulses to produce an output signal only when multiple coincidence of the borders occur, such multiple coincidences being representative of symmetric and straight line borders, means for receiving the said border signals and delaying the same for a given predetermined number of scan lines of the area under observation thereby indicating the presence of symmetric and straight line borders indicative of man-made objects and targets.

4. A target detector system for extracting symmetrical and straight line data information according to claim 2 and wherein the said means for converting the said coincidence points indicative of area borders into electrical signals comprises a pair of light-sensitive photo-cells, an imaging lens and dichroic mirror for separating the dual light paths and imaging same upon the pair of photo-electric cells each responsive to the light paths separated for converting the said light into electrical signals indicative of border coincidence.

5. A target detector system for extracting symmetrical and straight line data information according to claim 2 and wherein the said means disposed in one of the said light paths for reversing and horizontally and vertically displacing the scan relative to the other to accomplish all possible shifted overlapping of one scan relative to the other comprises an inverting lens for inverting the scanning image and a mirror type drum having a plurality of elongated mirror strips each spaced from the other so disposed about the outer periphery of the drum so as to give the effect of vertical displacement of the scan when the drum is rotated about its longitudinal axis, the drum also being disposed to undergo a tilting movement along the said longitudinal axis to give the effect of horizontal displacement of the scan.

6. A target detector system for extracting symmetric and straight line data information indicative of man-made structures according to claim 2 and wherein the said means disposed to extract electrical signals which are repetitive and regular and indicative of symmetric and straight line borders from those signals which are erratic and random in nature includes a counter for receiving the said repetitive and erratic signals which is responsive only to the repetitive signals to produce an output signal indicative of a predetermined number of said repetitive input signals.

7. A target detection system for extracting symmetric and straight line data information indicative of man-made structures according to claim 2 and wherein the said means disposed to extract those electrical signals which are repetitive and regular and indicative of symmetric and straight line borders from those that are erratic and random in nature for a predetermined interval of time includes a bi-stable multivibrator for receiving the said electrical signals, the first of the said electrical signals triggering on the multivibrator for a period of time and the multivibrator being turned off by a sync pulse from the said stabilized signal source, the output of the said multivibrator being a detected signal indicative of the presence of border signals during a particular scan line, an "and" circuit for simultaneously receiving the detected signal and a sync pulse for the generation of an output signal indicative of the presence of both sync and detected signals, an "or" circuit for receiving both the output signal of the "and" circuit and the sync pulse, the output of the "or" circuit being indicative of the presence of one but not both of the sync and "or" circuit signals at the input thereof, a counter circuit for receiving both the sync pulse and the output signal of the "or" circuit, the counter being selectively adjustable to receive and count a predetermined fixed number of consecutive scan pulses each representative of a scan line, so as to produce an output pulse at the end of the said fixed number of scan pulses and also being disposed to commence counting over again when an "or" signal is received, the said "or" signal being indicative of the absence of a scan pulse, a second bi-stable multivibrator circuit for receiving the output pulse from the counter circuit at the end of the predetermined number of scan lines to turn on the said multivibrator, a delay line circuit for receiving the output signal of the "or" circuit to cause the same to be delayed for the said predetermined number of scan lines, the output signal of the said delay circuit being transmitted to the second multivibrator to turn it off, a gating circuit for receiving both the output signal of the second multivibrator circuit and the electrical signals, to cause the same to conduct for the duration of the said output signal to permit the transmission of the said electrical signals during the particular scan period, means including a cathode-ray oscilloscope for receiving and recording the said electrical signals for purposes of observing the said signals over the said predetermined number of scan lines.

8. A target detection system for extracting symmetric and straight line data information indicative of man-made structures according to claim 2 and wherein the said means disposed to extract those electrical signals which are repetitive and regular and indicative of symmetric and straight line borders from those that are erratic and random in nature for a predetermined interval of time includes means responsive to the first of the said electrical signals for initiating a detected pulse and responsive to a sync pulse for terminating the said detected pulse, the said sync pulse originating from the said stabilized signal source, the detected signal being indicative of the presence of border signals during a particular scan line, a first circuit for simultaneously receiving the detected signal and a sync pulse for the generation of an output signal indicative of the presence of both sync and detected signals, a second circuit for receiving both the output signal of the said first circuit and the sync pulse, the output of the said second circuit being indicative of the presence of one but not both of the sync and second circuit signals at the input thereof, a counter circuit for receiving both the sync pulse and the output signal of the second circuit, the counter being selectively adjustable to receive and count a pre-determined fixed number of consecutive scan pulses, each representative of a scan line, so as to produce an output pulse at the end of the said fixed number of scan pulses and also disposed to commence counting over again when second circuit signal is received, the said second signal being indicative of the absence of a scan pulse, means responsive to the output pulse from the counter circuit at the end of the predetermined number of scan lines to initiate a gating signal, a delay line circuit for receiving the output signal of the said second circuit to cause the said output signal to be delayed for the said predetermined number of scan lines, the output signal of the said delay circuit being transmitted to the gating signal means to terminate the gating signal, a gating circuit for receiving both the gating signal and the electrical signals, to cause the gating circuit to conduct for the duration of the gating signal from initiation to termination to permit the transmission of the said electrical signals during the particular scan period, means including a cathode-ray oscilloscope for receiving and recording the said electrical signals for purposes of observing the said signals over the said predetermined number of scan lines.

9. A target detection system for extracting symmetric and straight line data information indicative of man-made structures according to claim 2 and wherein the said means disposed to extract those electrical signals which are repetitive and regular and indicative of symmetric and straight line borders from those that are erratic and random in nature for a predetermined interval of time includes means responsive to the first of the said electrical signals for initiating a detected pulse and responsive to a sync pulse for terminating the said detected pulse, the said sync pulse originating from the said stabilized signal source, the detected signal being indicative of the presence of border signals during a particular scan line, an "and" circuit for simultaneously receiving the detected signal and a sync pulse for the generation of an output signal indicative of the presence of both sync and detected signals, an "or" circuit for receiving both the output signal of the "and" circuit and the sync pulse, the output of the "or" circuit being indicative of the presence of one but not both of the sync and "or" circuit signals at the input thereof, a counter circuit for receiving both the sync pulse and the output signal of the "or" circuit, the counter being selectively adjustable to receive and count a predetermined fixed number of consecutive scan pulses, each representative of a scan line, so as to produce an output pulse at the end of the said fixed number of scan pulses and also disposed to commence counting over again when an "or" signal is received, the said "or" signal being indicative of the absence of a scan pulse, a bi-stable multivibrator circuit for receiving the output pulse from the counter circuit at the end of the predetermined number of scan lines to turn on the said multivibrator, a delay line circuit for receiving the output signal of the "or" circuit to cause the same to be delayed for the said predetermined number of scan lines, the output signal of the said delay circuit being transmitted to the multivibrator to turn it off, a gating circuit for receiving both the output signal of the second multivibrator circuit and the electrical signals, to cause the same to conduct for the duration of the said output signal to permit the transmission of the said electrical signals during the particular scan period, means including a cathode-ray oscilloscope synchronized from the said stabilized signal source for receiving and recording the said electrical signals for purposes of observing the said signals over the said predetermined number of scan lines.

10. A target detection system for extracting symmetric and straight line data information indicative of man-made structures according to claim 9 and wherein the said recording means includes a motion picture film camera synchronized from the said stabilized signal source.

11. A target detection system for extracting symmetric and straight line data information indicative of man-made structures according to claim 2 and wherein the said means disposed to extract those electrical signals which are repetitive and regular and indicative of symmetric and straight line borders from those that are erratic and random in nature for a predetermined interval of time includes a bi-stable multivibrator for receiving the said electrical signals, the first of the said electrical signals turning on the multivibrator to cause it to conduct for a period of time with the conduction subsequently terminated by the injection of the trailing edge of a sync pulse from the stabilized signal source to the multivibrator, the output of the said multivibrator being a detected signal indicative of the presence of border signals during a particular scan line, an "and" circuit for simultaneously receiving the detected signal and a sync pulse for the generation of an output signal indicative of the presence of both sync and detected signals, an "or" circuit for receiving both the output signal of the "and" circuit and the sync pulse, the output of the "or" circuit being indicative of the presence of one but not both of the sync and "or" circuit signals at the input thereof, a counter circuit for receiving both the sync pulse and the output signal of the "or" circuit, the counter being selectively adjustable to receive and count a predetermined fixed number of consecutive scan pulses, each representative of a scan line, so as to produce an output pulse at the end of the said fixed number of scan pulses and also disposed to commence counting over again when an "or" signal is received, the said "or" signal being indicative of the absence of a scan pulse, a second bi-stable multivibrator circuit for receiving the output pulse from the counter circuit at the end of the predetermined number of scan lines to turn on the said multivibrator, a delay line circuit for receiving the output signal of the "or" circuit to cause the same to be delayed for the said predetermined number of scan lines, the output signal of the said delay circuit being transmitted to the second multivibrator to turn it off, a gating circuit for receiving both the output signal of the second multivibrator circuit and the electrical signals, to cause the same to conduct for the duration of the said output signal to permit the transmission of the said electrical signals during the particular scan period, a cathode-ray tube oscilloscope including a signal delay line connected therewith for delaying the electrical signals to the oscilloscope for the said predetermined number of scan lines and film recording means for image storing the oscilloscope display of the said electrical signals over the said predetermined number of scan lines.

References Cited in the file of this patent

UNITED STATES PATENTS

| | | |
|---|---|---|
| 2,679,636 | Hillyer | May 25, 1954 |
| 2,894,248 | Relis et al. | July 7, 1959 |
| 2,896,501 | Stamps | July 28, 1959 |